(12) United States Patent
Dunn

(10) Patent No.: US 8,534,688 B1
(45) Date of Patent: Sep. 17, 2013

(54) TANDEM BAR GUIDE PIN ASSEMBLY

(76) Inventor: Darrin D. Dunn, Henderson, TN (US)

( * ) Notice: Subject to any disclaimer, the term of this patent is extended or adjusted under 35 U.S.C. 154(b) by 0 days.

(21) Appl. No.: 13/559,761

(22) Filed: Jul. 27, 2012

(51) Int. Cl.
*B62D 53/06* (2006.01)

(52) U.S. Cl.
USPC ....................................................... 280/149.2

(58) Field of Classification Search
USPC ............... 180/209; 280/1, 147, 149.2, 24.01, 280/24.02, 24.03
See application file for complete search history.

(56) References Cited

U.S. PATENT DOCUMENTS

| | | | |
|---|---|---|---|
| D311,482 S | 10/1990 | Morton | |
| 5,346,233 A | 9/1994 | Moser | |
| 5,658,000 A * | 8/1997 | Boudreaux | 280/149.2 |
| 5,678,834 A | 10/1997 | Wise | |
| 5,716,071 A | 2/1998 | Stanley et al. | |
| 5,813,682 A | 9/1998 | Stevens | |
| 6,345,832 B1 | 2/2002 | Ellis | |
| 6,485,054 B1 * | 11/2002 | Yurgevich | 280/149.2 |
| D484,774 S | 1/2004 | Jones | |
| 6,702,310 B2 * | 3/2004 | Browning | 280/149.2 |
| 6,793,233 B2 | 9/2004 | Eckelberry et al. | |

* cited by examiner

*Primary Examiner* — Faye M. Fleming

(57) ABSTRACT

A tandem bar guide pin assembly for independently adjusting a tandem bar on a trailer to desired position for even weight distribution includes an elongated shaft having a first end and a second end. The second end is configured for insertion into a hole on a tandem bar whereby the shaft is positioned to obstruct movement of a trailer along the tandem bar. A head is coupled to the first end of the shaft to preventing the first end of the shaft from passing through the hole in the tandem bar. A slot extending into the head is configured for receiving a flange of the tandem bar. The flange is adjacent the hole of the tandem bar. Thus when the slot is engaged, the shaft is prevented from rotating in the hole of the tandem bar.

14 Claims, 2 Drawing Sheets

TANDEM BAR GUIDE PIN ASSEMBLY

BACKGROUND OF THE DISCLOSURE

Field of the Disclosure

The disclosure relates to truck tandem pin assemblies and more particularly pertains to a new truck tandem pin assembly for independently adjusting a tandem bar on a trailer to desired position for even weight distribution.

SUMMARY OF THE DISCLOSURE

An embodiment of the disclosure meets the needs presented above by generally comprising an elongated shaft having a first end and a second end. The second end is configured for insertion into a hole on a tandem bar whereby the shaft is positioned to obstruct movement of a trailer along the tandem bar. A head is coupled to the first end of the shaft to preventing the first end of the shaft from passing through the hole in the tandem bar. A slot extending into the head is configured for receiving a flange of the tandem bar. The flange is adjacent the hole of the tandem bar. Thus when the slot is engaged, the shaft is prevented from rotating in the hole of the tandem bar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
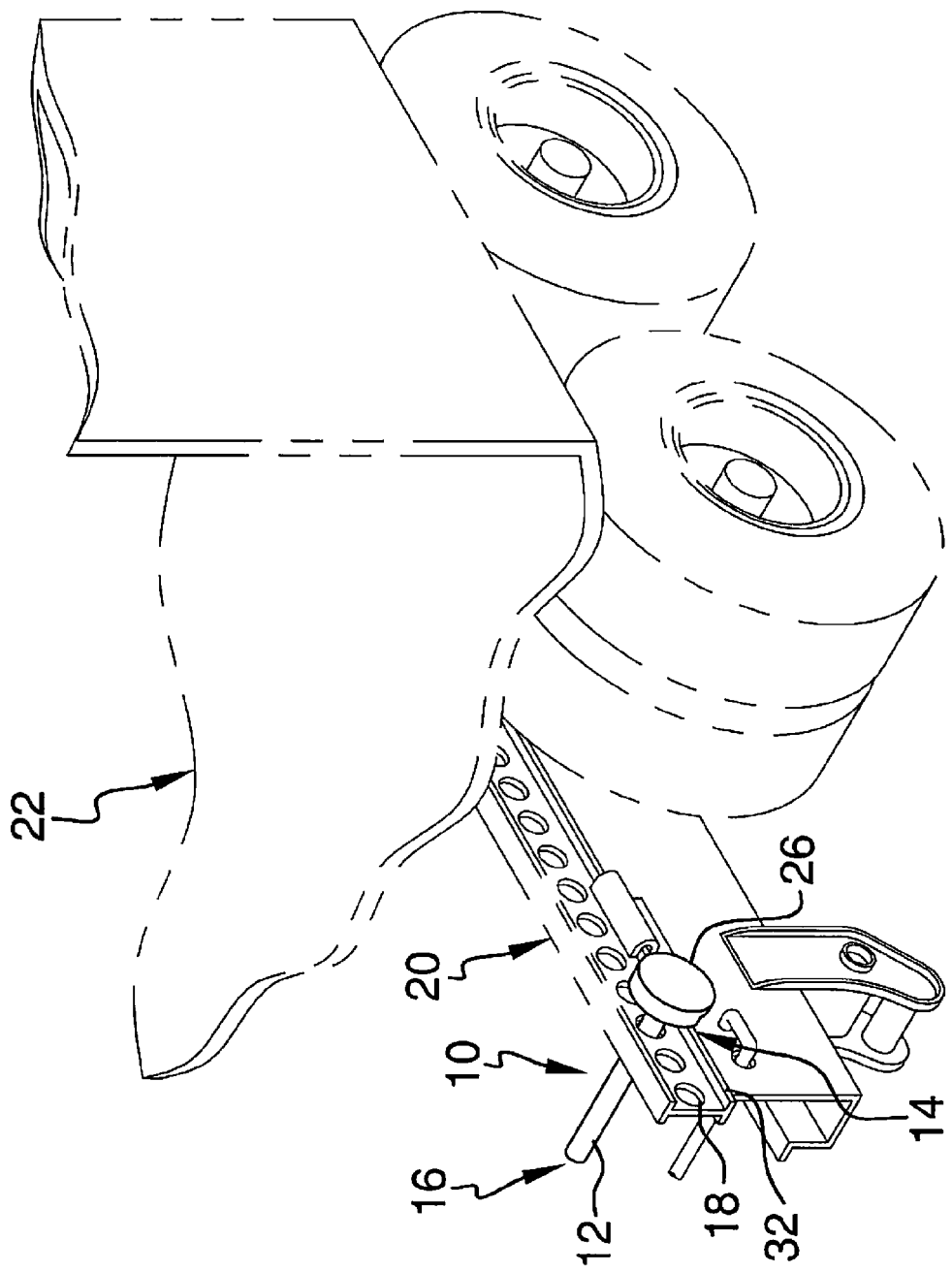
FIG. 1 is a top front side perspective view of a tandem bar guide pin assembly in use according to an embodiment of the disclosure.
Figure 2:
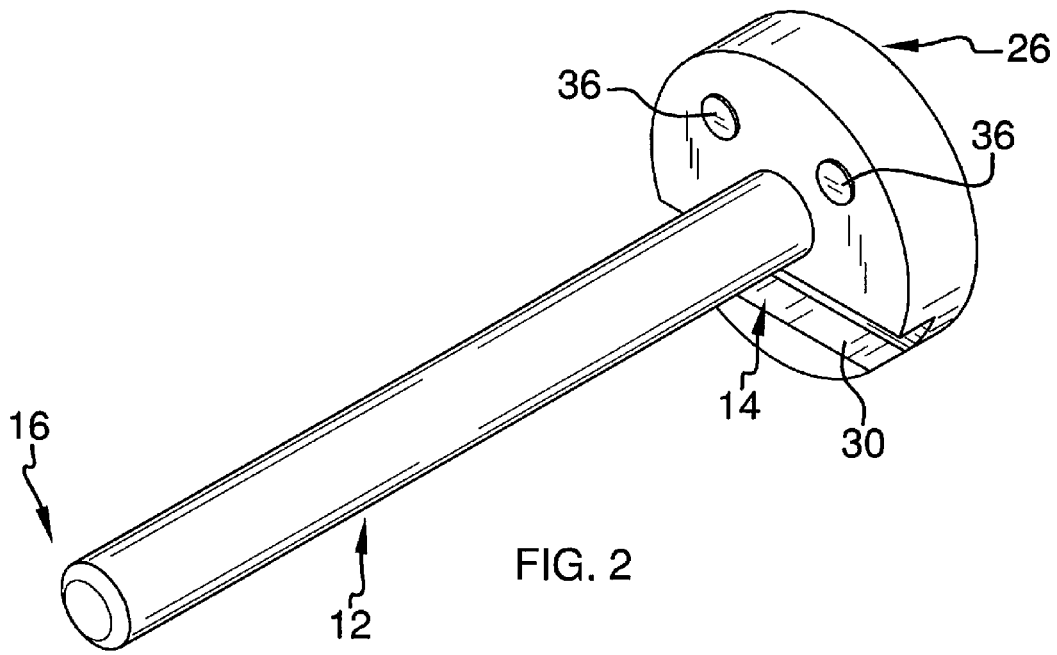
FIG. 2 is a top front side perspective view of an embodiment of the disclosure.
Figure 3:
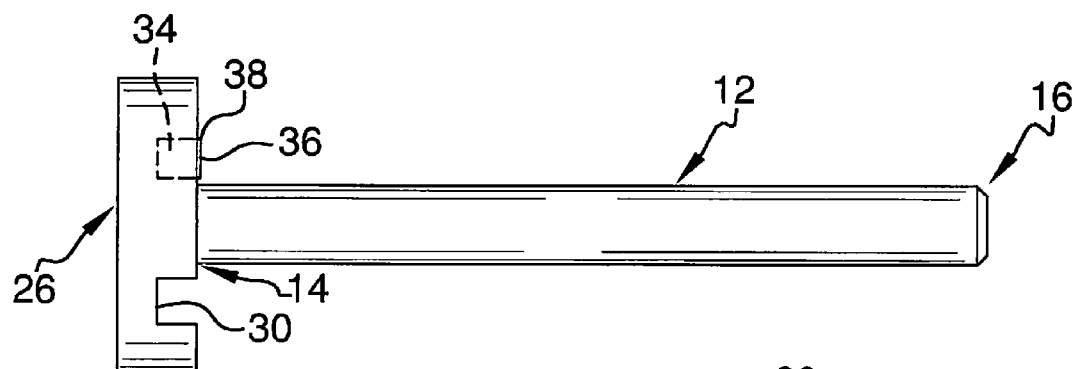
FIG. 3 is a side view of an embodiment of the disclosure.
Figure 4:
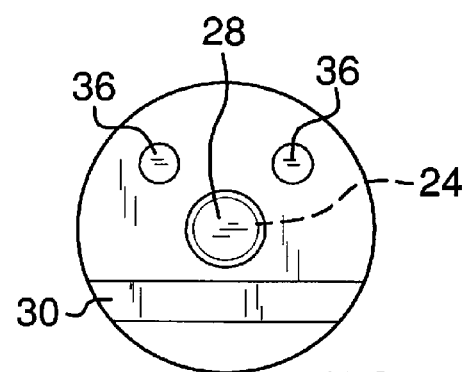
FIG. 4 is a magnified front view of an embodiment of the disclosure.

With reference now to the drawings, and in particular to FIGS. 1 through 4 thereof, a new truck tandem pin assembly embodying the principles and concepts of an embodiment of the disclosure and generally designated by the reference numeral 10 will be described.

As best illustrated in FIGS. 1 through 4, the tandem bar guide pin assembly 10 generally comprises an elongated shaft 12 having a first end 14 and a second end 16. The second end 16 of the elongated shaft 12 is configured for insertion into a hole 18 on a tandem bar 20 whereby the elongated shaft 12 is positioned to obstruct movement of a trailer 22 along the tandem bar 20. The elongated shaft 12 is constructed of a strong material, such as solid steel, and may be made luminescent to facilitate use of the assembly 10 at night. The elongated shaft 12 may have a length between 20 centimeters and 30 centimeters and a width between 1 centimeter and 4 centimeters. The second end 16 of the elongated shaft 12 has a beveled edge 24 extending from and around the second end 16 of the elongated shaft 12. A disc-shaped head 26 is coupled to the first end 14 of the shaft 12. The head 26 may also be luminescent. The disc-shaped head 26 may have a diameter between 8 centimeters and 12 centimeters and a thickness between 1 centimeter and 4 centimeters. The head 26 may be constructed of a strong metal material such as solid steel. The head 26 is configured for preventing the first end 14 of the elongated shaft 12 from passing through the hole 18 in the tandem bar 20 when the second end 16 is inserted into the hole 18. The first end 14 of the elongated shaft 12 may be coupled to the disc-shaped head 26 proximate a center 28 of the disc-shaped head 26. The shaft 12 extends transversely from the disc-shaped head 26.

A slot 30 extends into the disc-shaped head 26. The slot 30 is configured for receiving a flange 32 of the tandem bar 20 adjacent the hole 18 of the tandem bar 20. Thus, the elongated shaft 12 is prevented from rotating in the hole 18 of the tandem bar 20. The slot 30 has a width between 1 centimeter and 4 centimeters and a depth between 1 centimeter and 4 centimeters.

At least one magnet 36 is coupled to the head 26. As shown, a pair of cylindrical magnets 36 is coupled to the disc-shaped head 26. Each magnet 36 is configured for magnetically engaging the tandem bar 20 when the elongated shaft 12 is inserted into the hole 18 in the tandem bar 20. Thus, the elongated shaft 12 is held in the hole 18 of the tandem bar 20. The magnets 36 are positioned in spaced relationship. The magnets 36 may be aligned in parallel spaced relationship to the slot 30 in the disc-shaped head 26. The elongated shaft 12 may be positioned between the aligned magnets 36 and the slot 30.

A pair of sockets 34 may extend into the disc-shaped head 26 to receive the magnets 36. Each magnet 36 is inserted into an associated one of the sockets 34 in the disc-shaped head 26. Each magnet 36 has a distal portion 38 extending from the associated socket 34 when the magnet 36 is fully inserted into the disc-shaped head 26.

In use, the tandem bar guide pin assembly 10 allows a single person to adjust the position of the tandem bar 20 to evenly distribute weight of the trailer 22. The tandem bar 20 on a trailer 22 may be moved back and forth. The tandem bar has holes 18 in a spaced relationship, each hole 18 representing a specific weight adjustment. The shaft 12 is inserted in the desired hole 18 based on the desired weight adjustment. The trailer 22 is then moved carefully forward or backward until the trailer 22 contacts and is stopped by the shaft 12. The trailer 22 is stopped in the desired position distributing the weight as desired. The trailer 22 may then be secured to the tandem bar 20 in conventional fashion and the shaft 12 removed from the hole 18 if desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tandem bar guide pin assembly comprising:
   an elongated shaft having a first end and a second end, said second end being configured for insertion into a hole on a tandem bar whereby said shaft is positioned to obstruct movement of a trailer along the tandem bar;
   a head coupled to said first end of said shaft, said head being configured for preventing said first end of said shaft from passing through the hole in the tandem bar; and
   a slot extending into said head, said slot being configured for receiving a flange of the tandem bar adjacent the hole whereby said shaft is prevented from rotating in the hole of the tandem bar.

2. The assembly of claim 1, further including a magnet coupled to said head, said magnet being configured for magnetically engaging the tandem bar when said shaft is inserted into the hole in the tandem bar whereby said shaft is held in the hole of the tandem bar.

3. The assembly of claim 1, further including said first end of said shaft being coupled to said head proximate a center of said head.

4. The assembly of claim 1, further including said head being disc-shaped.

5. The assembly of claim 2, further including said magnet being one of a pair of said magnets, said magnets being positioned in spaced relationship to each other.

6. The assembly of claim 5, further including said magnets being aligned in parallel spaced relationship to said slot in said head.

7. The assembly of claim 6, further including said shaft being positioned between said aligned magnets and said slot.

8. The assembly of claim 1, further including said shaft extending transversely from said head.

9. The assembly of claim 1, further including said head and said shaft being luminescent.

10. The assembly of claim 1, further including a beveled edge extending from and around said second end of said shaft.

11. The assembly of claim 2, further including said magnet being cylindrical.

12. The assembly of claim 2, further comprising:
    a socket extending into said head; and
    said magnet being inserted into said socket in said head.

13. The assembly of claim 12, further including said magnet having a distal portion extending from said socket when said magnet is fully inserted into said head.

14. A tandem bar guide pin assembly comprising:
    an elongated shaft having a first end and a second end, said second end being configured for insertion into a hole on a tandem bar whereby said shaft is positioned to obstruct movement of a trailer along the tandem bar, said shaft being luminescent;
    a beveled edge extending from and around said second end of said shaft;
    a head coupled to said first end of said shaft, said head being disc-shaped, said head being configured for preventing said first end of said shaft from passing through the hole in the tandem bar, said first end of said shaft being coupled to said head proximate a center of said head, said shaft extending transversely from said head, said head being luminescent;
    a slot extending into said head, said slot being configured for receiving a flange of the tandem bar adjacent the hole whereby said shaft is prevented from rotating in the hole of the tandem bar;
    a pair of sockets extending into said head; and
    a pair of magnets coupled to said head, each said magnet being cylindrical, each said magnet being configured for magnetically engaging the tandem bar when said shaft is inserted into the hole in the tandem bar whereby said shaft is held in the hole of the tandem bar, said magnets being positioned in spaced relationship, said magnets being aligned in parallel spaced relationship to said slot in said head, said shaft being positioned between said aligned magnets and said slot, each said magnet being inserted into an associated one of said sockets in said head, each said magnet having a distal portion extending from said associated socket when said magnet is fully inserted into said head.

\* \* \* \* \*